United States Patent [19]
Quigg

[11] Patent Number: 5,158,309
[45] Date of Patent: Oct. 27, 1992

[54] STAIR CLIMBING APPARATUS FOR COLLAPSIBLE WHEELCHAIR

[76] Inventor: Robert T. Quigg, 118 Hickory Dr., Hatfield, Pa. 19440

[21] Appl. No.: 623,082

[22] Filed: Dec. 6, 1990

[51] Int. Cl.[5] .............................................. A61G 5/06
[52] U.S. Cl. .......................... 280/5.22; 280/DIG. 10; 180/9.32; 180/907
[58] Field of Search ...................... 280/5.22, 5.2, 5.28, 280/5.32, 250.1, 304.1, DIG. 10; 180/901, 907, 9.32, 6.48, 8.2

[56] References Cited

U.S. PATENT DOCUMENTS

| | | | |
|---|---|---|---|
| 2,751,027 | 6/1956 | McLaughlin | 280/DIG. 10 |
| 3,064,744 | 11/1962 | Jennings | 180/907 |
| 3,191,953 | 6/1965 | Aysta | 280/250.1 |
| 3,529,688 | 9/1970 | Bruce | 280/5.22 |
| 4,566,707 | 1/1986 | Nitzberg | 280/DIG. 10 |
| 5,042,607 | 8/1991 | Falkenson et al. | 180/6.48 |

FOREIGN PATENT DOCUMENTS 1363987 5/1964 France ......................... 280/DIG. 10
2574740 6/1986 France ......................... 280/DIG. 10

*Primary Examiner*—Charles A. Marmor
*Assistant Examiner*—Anne Marie Boehler
*Attorney, Agent, or Firm*—Richard C. Litman

[57] ABSTRACT

A stair-climbing attachment for a conventional foldable wheelchair including clutch mechanisms connecting the main wheels of the wheelchair to a drive mechanism for manually driving stair-climbing treads, ratchet and pawl mechanisms to selectively prevent or permit descending movement of the wheelchair on stairs, and manually actuated levers to manually position the treads in an operable and inoperable condition, the attachment permitting the wheelchair to be folded and conveniently transported by the user without outside assistance. A second embodiment incorporates a reversible motor to drive the treads. A third embodiment uses a hydraulic mechanism to position the treads.

10 Claims, 8 Drawing Sheets

STAIR CLIMBING APPARATUS FOR COLLAPSIBLE WHEELCHAIR

FIELD OF THE INVENTION

This invention relates generally to an apparatus to be attached to a conventional, collapsible wheelchair so as to enable a wheelchair bound individual to independently ascend and descend stairs and other obstacles such as curbs without assistance from another individual.

BACKGROUND OF THE INVENTION

Stair-climbing apparatus mounted on wheelchairs are known. For the most part, these devices are battery powered, motor driven, and not collapsible, making it difficult for the user to independently load the wheelchair into a car when traveling from one location to another, so as to have the wheelchair available at the succeeding locations. These wheelchairs are heavy and bulky, and not generally collapsible so as to be readily loadable independently into a car by the user.

PRIOR ART

Representative examples of such wheelchairs include: U.S. Pat. No. 2,751,027 issued to Robert B. McLaughlin which discloses two battery-operated motors for driving two pairs of treads, one pair located on each side of the wheelchair; U.S. Pat. No. 3,288,234 issued to Jack M. Feliz which discloses a stair-climbing conveyance which is collapsible from top to bottom rather than from side to side; U.S. Pat. No. 4,401,178 issued to Beat W. Studer which discloses a carrier for a wheelchair, which carrier is operated by an assistant; and U.S. Pat. No. 4,566,551 which is also issued to Jack M. Feliz.

U.S. Pat. No. 4,044,850 issued to Malcolm C. Winsor indicates in the disclosure that the stair climbing apparatus described therein may be either motor-driven or manually operated. The specific description, however, is limited to the motorized version. U.S. Pat. No. 4,061,199 issued to Werner Last discloses a manually operated stair-climbing apparatus for a wheelchair comprising a manual lever 21 and a clamp or gripper device which grips and drives an elastic belt. As disclosed by Last, the apparatus requires an assistant to operate the gripper device.

SUMMARY AND OBJECTS OF THE INVENTION

My invention is directed to an apparatus, formed of lightweight but strong materials such as tubular aluminum and titanium, attached to a conventional wheelchair which may be folded from side to side for easy and convenient transport in a car, the apparatus being manually operable by a user to ascend and descend stairs or other obstacles such as curbs, independently without assistance from another individual. The device is provided with a plurality of treads engageable with the stairs, a clutch means for connecting and disconnecting tread drive means with the manually rotatable wheels to thereby drive the treads manually when the wheels are disengaged from the ground and the stairs or other obstacles, and with lever means operable by the user to enable alignment of the front treads with the rear treads and thereby operatively raise the wheels from the ground when it is desired to ascend or descend stairs or other obstacles. Also provided is a ratchet and multiple pawl device controlled by cams and a unidirectional clutch which in one operating condition will prevent descending movement of the wheelchair when ascending stairs, and in a second condition will permit descending movement of the wheelchair in a controlled manner enabling the user to control manually both the speed of descent and the stopping of the descent as desired, simply by the manual rotation of the wheels.

In a second embodiment, the tread drive means are connected to battery-powered motors on each side of the wheelchair, arranged in such a manner as to permit side-to-side collapse of the wheelchair and convenient transport thereof.

In a third embodiment, the front treads may be raised and lowered hydraulically under control of a conventional drive means.

It is an object of this invention to provide a collapsible wheelchair with a lightweight apparatus for the purpose of ascending and descending stairs or other obstacles under the control of the user without the need of an assistant.

It is another object of the invention to permit the user to operate the apparatus manually in a safe and efficient manner.

It is another object to provide in a second embodiment battery-powered tread drive means while retaining the collapsible feature of the wheelchair.

It is another object of the invention in a third embodiment to provide hydraulic means for raising the lowering the front treads between inoperative and operative positions.

It is contemplated that the apparatus may combine two or more of the disclosed inventive features. It is further contemplated that the apparatus and wheelchair may be factory-assembled or that existing wheelchairs may be retrofitted with the stair-ascending and -descending apparatus.

Other objects, features and advantages of this invention will be apparent from the following detailed description and the appended claims, reference being made to the accompanying drawings figures forming a part of the specification, wherein like reference numerals designate corresponding parts of the several views.

BRIEF DESCRIPTION OF THE DRAWINGS

FIG. 2 is a side view showing the wheelchair and stair climbing apparatus in position to ascend and descend stairs, curbs and the like;

DETAILED DESCRIPTION OF PREFERRED EMBODIMENTS

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein are for the purpose of description and not limitation.

Figure 1:
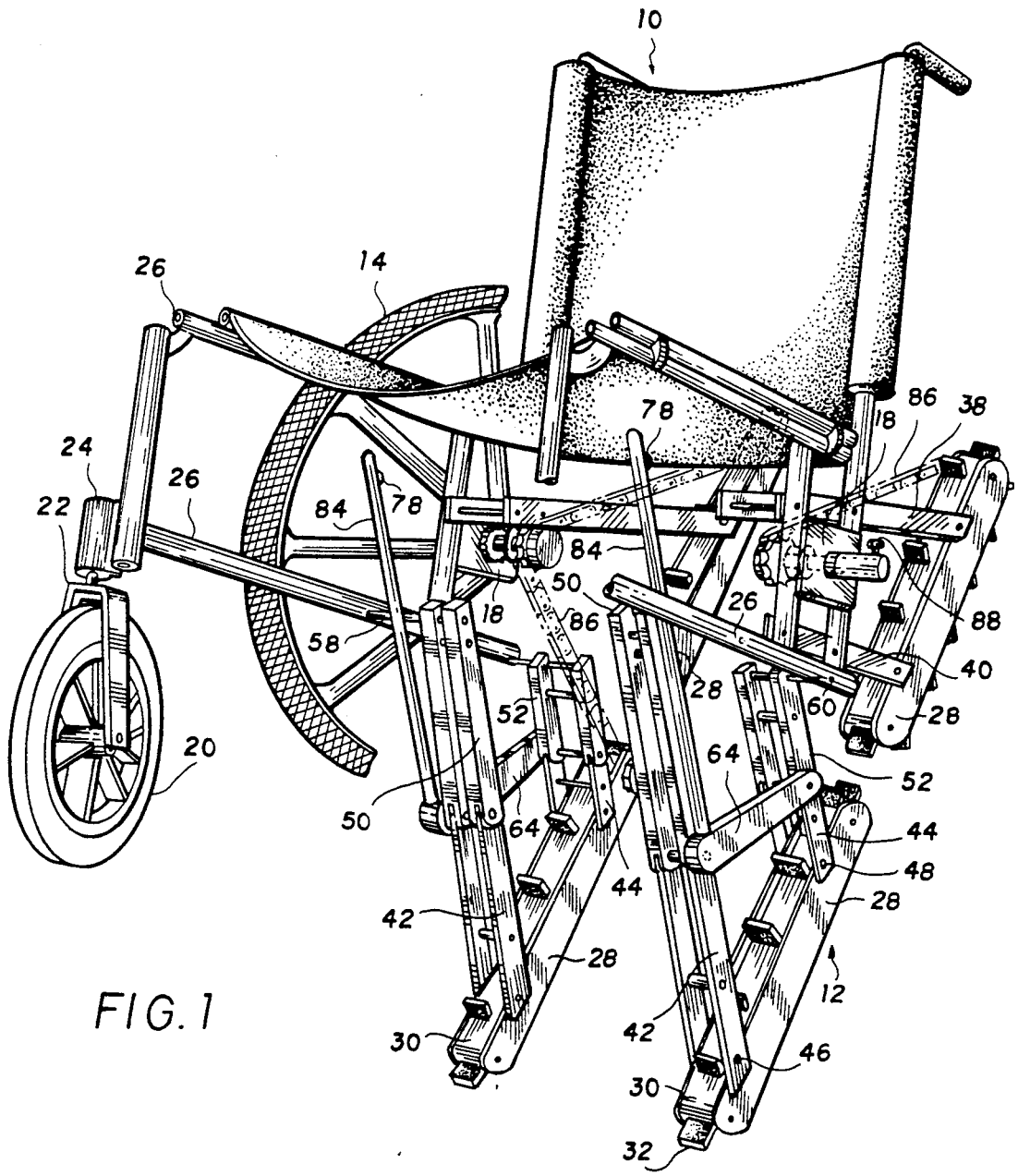
FIG. 1 is a perspective view with parts broken away showing the stair climbing apparatus attached to a conventional foldable wheelchair.

Turning now to the drawing figures, in FIG. 1 there is shown a conventional collapsible wheelchair 10 with parts removed to show the stair climbing apparatus 12 connected thereto. Wheelchair 10 has two laterally spaced drive wheels 14, each connected to a respective left and right rotatable shaft 16 mounted by conventional bearings (not shown) on frame plates 18. Also shown are conventional caster wheels 20 mounted by means of a fork 22 on a cylindrical portion 24 of a tubular frame 26 of said wheelchair. When wheels 14 are rotated by hand in either the clockwise or counterclockwise direction wheelchair 10 is propelled in the corresponding direction, with casters 20 providing stability and also directional control.

Figure 2:
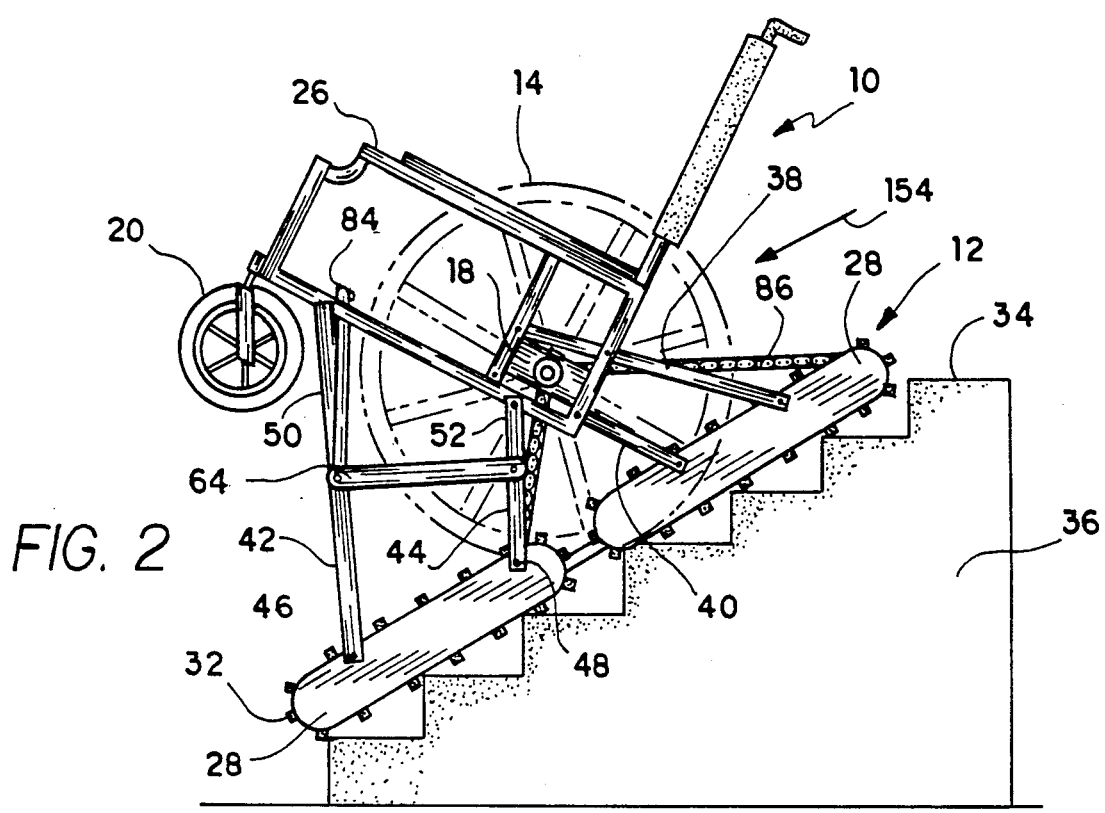
Figure 3:
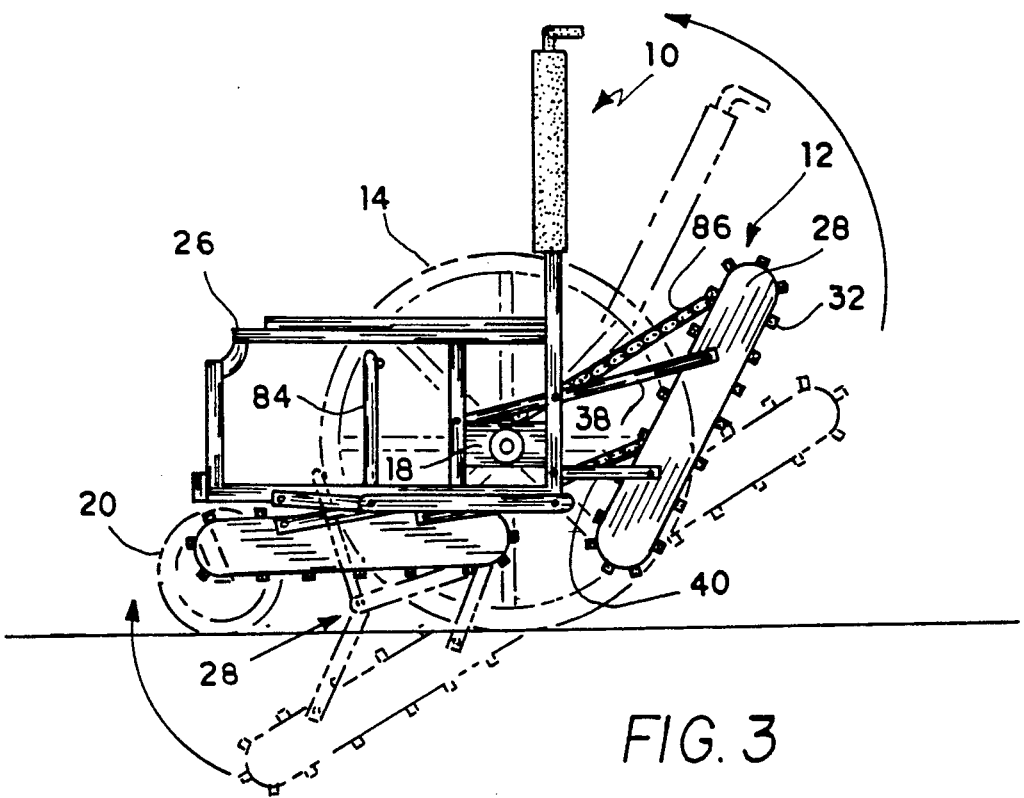
FIG. 3 is a side view showing the treads of the stair climbing apparatus in an inoperative position allowing the wheelchair to be propelled along the level ground.
Figure 4:
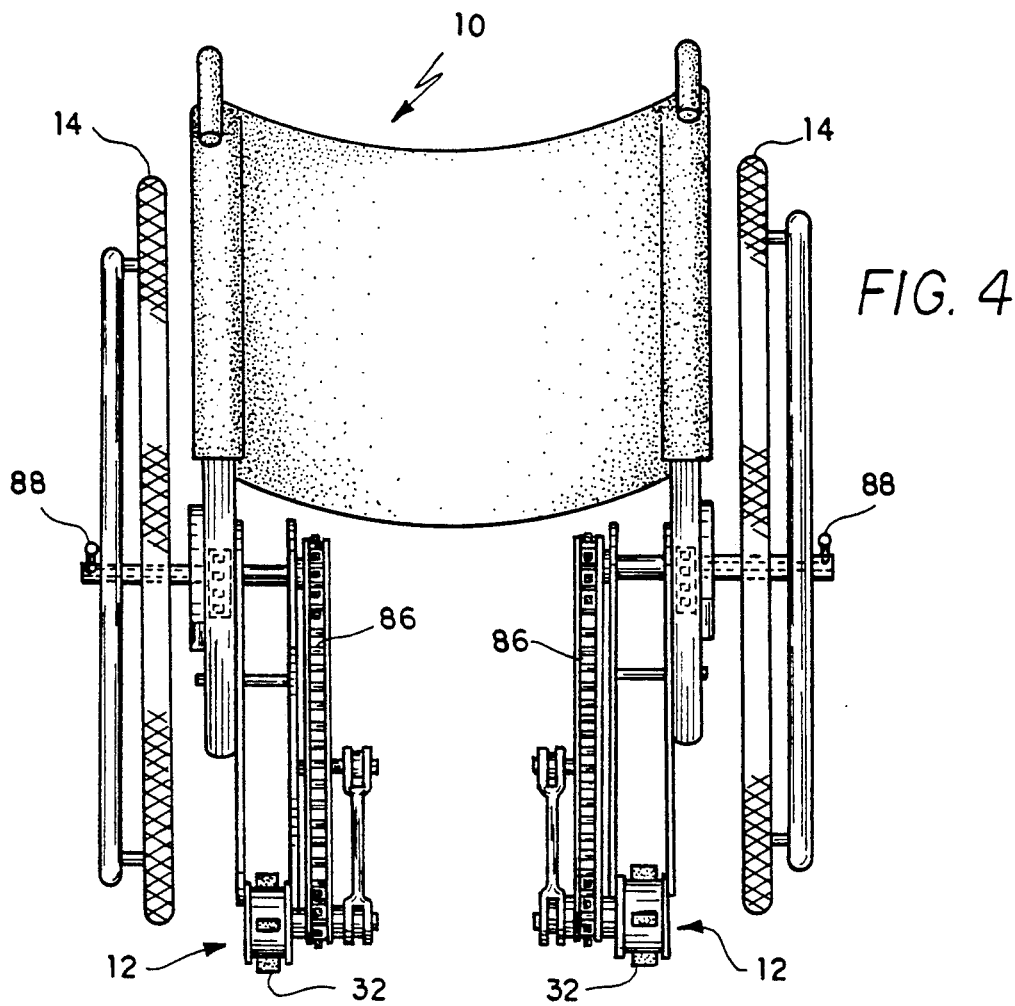
FIG. 4 is a rear view of the wheelchair and stair climbing apparatus showing the drive trains from the rotatable wheels to the respective treads.

Stair climbing apparatus 12 comprises a plurality of laterally spaced and aligned tread guides 28 which guide treads 30 having lugs 32 thereon for engaging curb or stair surfaces 34 for the purpose of propelling wheelchair 10 up or down stairs 36 as shown in FIG. 2. The rear tread guides 28 are fixedly mounted on frame 26 by means of flat struts 38 and 40 as shown in FIGS. 2 and 3. The forward laterally spaced tread guides 28 are mounted so as to movable between an operative position as shown in FIG. 2 and an inoperative position as shown in solid outline in FIG. 3.

Figure 5:
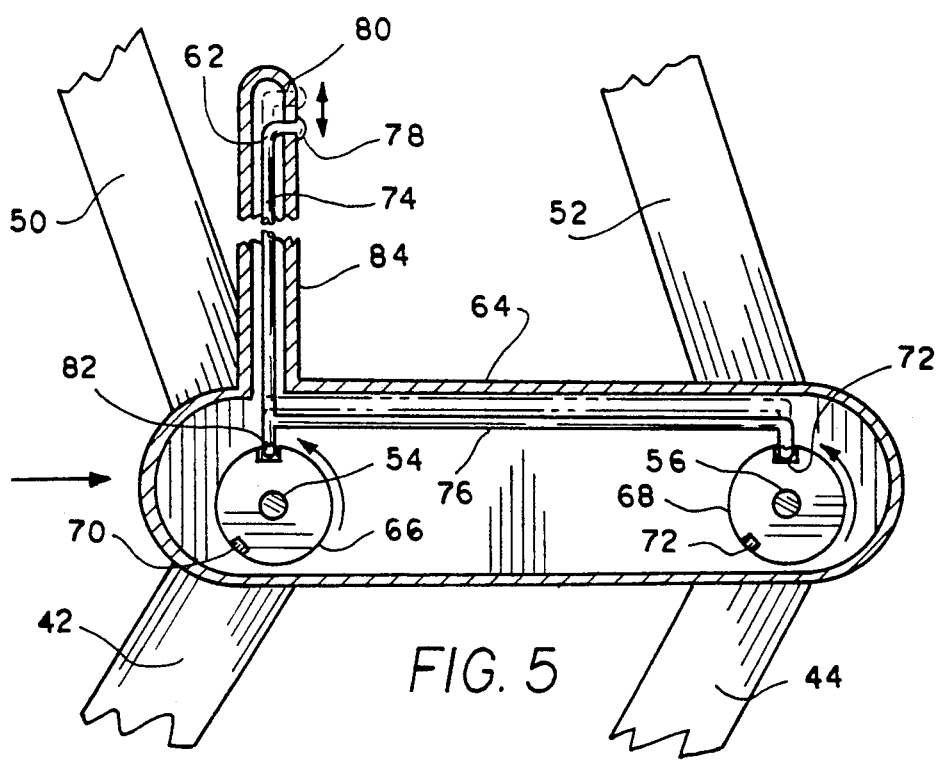
FIG. 5 is a cutaway side view showing the structure for raising and lowering the front treads, including locking means for locking the treads in the operative and inoperative positions.

More specifically, the forward tread guides 28 are pivotally connected to levers 42 and 44 at pivots 46 and 48 are respectively. Levers 42 and 44 are in turn pivoted to depending levers 50 and 52 as at pivots 54 and 56, respectively, as shown in FIG. 5. Depending levers 50 and 52 in turn are pivoted on pivots 58 and 60 connected to frame 26 as shown in FIG. 1.

Movement and locking in position of levers 42, 44, 50 and 52 are controlled by a control lever 62 disposed within a frame plate 64 mounted on pivots 54 and 56 as shown in FIG. 5. Fixedly connected to pivots 54 and 56 are lock plates 66 and 68 having lock notches 70 and 72 therein for a purpose to be described. Control lever 62 is formed with a vertical leg 74 and a horizontal leg 76. Vertical leg 74 has a knob 78 extending through an opening 80 in frame plate 64 to allow vertical shifting of control lever 62. Leg 76 of control lever 62 has lugs 82 which engage lock notches 70 and 72 to lock lock plates 66 and 68 in one of two positions when the forward tread guides 28 are moved between the operative and inoperative positions. Control lever 62 remains in locking position under gravity or spring bias. To position the forward guide plates 28, the user would first raise control lever 62 by grasping knob 78 and lifting knob 78 to disengage lugs 82 from lock notches 70 and 72. By shifting his or her weight the user can tilt the wheelchair, and by pushing or pulling extension 84 of frame plate 64 locate the forward guide plates 28 in the operative or inoperative position. When the forward guide plates 28 are properly located, release of knob 78 will allow lugs 82 to re-engage lock notches 70 and 72 to thereby lock plates 28 in the proper position.

Figure 6:
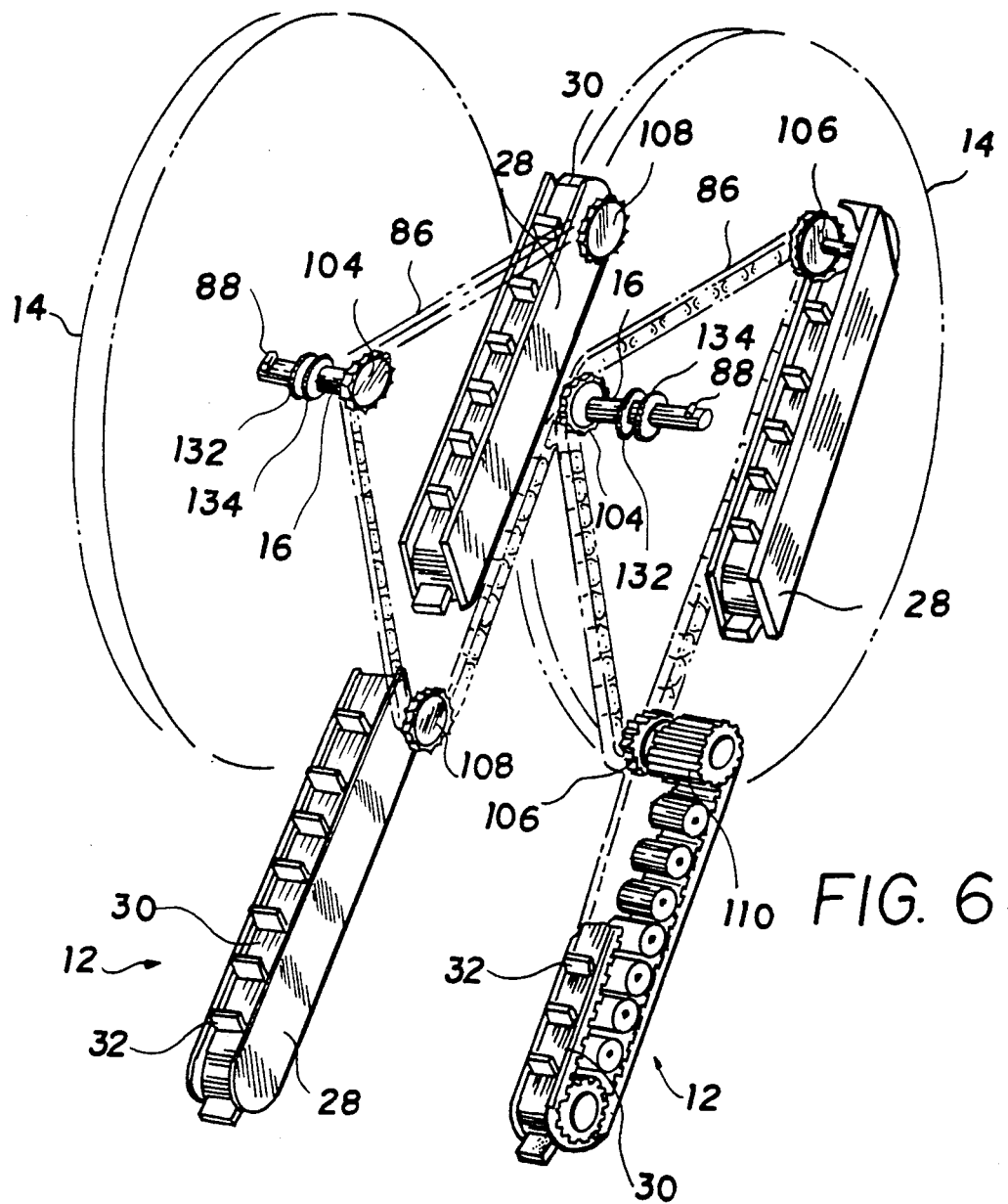
FIG. 6 is a detail view showing the driving connection between the driving chain and the treads and also showing the symmetrical alignment of the treads in the operative position.
Figure 7:
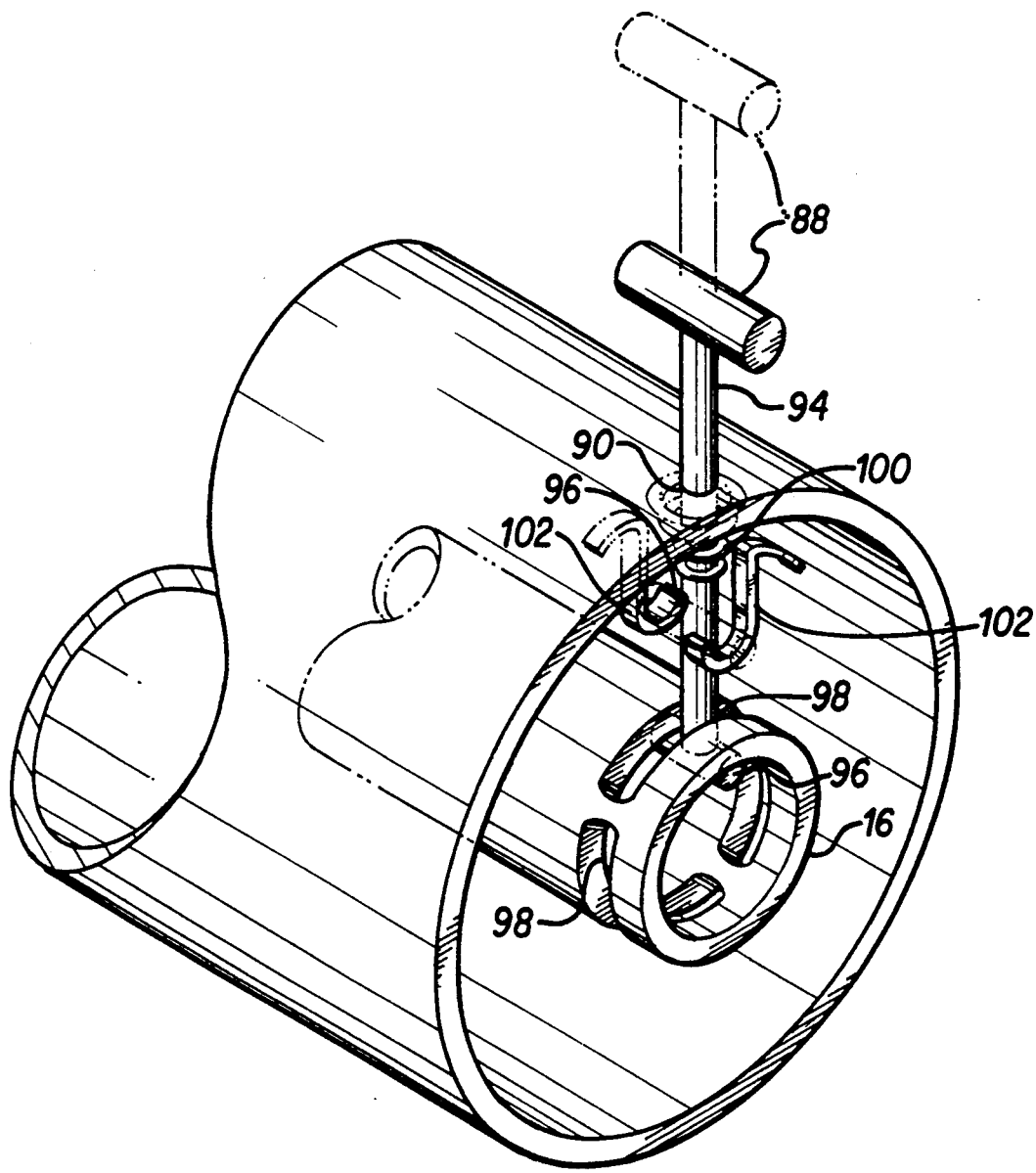
FIG. 7 is a detailed perspective view of the clutch means for connecting a respective wheelchair wheel hub to a respective drive shaft.

FIGS. 6 and 7 show the structure for connecting wheels 14 to a drive chain 86 for driving treads 30 in either the forward or reverse direction depending on whether the user is ascending or descending the stairs. In FIG. 7, T-handle 88 extends through an opening 90 in wheel hub 92. The shaft 94 of the T-handle has at its other end a crossbar 96 which is configured to enter a slot 98 in rotatable shaft 16 when the handle 88 is rotated 90° from the position shown. Handle 88 is spring-biased in the upper position as shown in dashed outline by spring 100. To connect wheel hub 92 to shaft 16 the user would rotate and depress handle 88 until cross bar 96 enters one of the slots 98 in shaft 16 and then rotate the handle 88 another 90° to latch crossbar 96 in the slot. Thereafter rotation of wheel 14 in either direction will also rotate shaft 16 in the same direction. Handle 88 is held in the disengaged position by clips 102 suitably connected to the inner wall of hub 92.

As shown in FIG. 6, sprocket drive wheels 104 are fixed to the respective left and right rotatable shafts 16 such that when shafts 16 are connected to wheels 14, thus rotating the wheels 14 in either the clockwise or counterclockwise direction, sprocket drive wheels 104 will also be driven in the same direction. Drive chains 86 are mounted on sprocket drive wheels 104 to be driven thereby. Chains 86 are also mounted on secondary sprocket drive wheels 106 and 108 connected to the left and right tread guides to thereby drive treads 30 in the desired direction by suitably connected gear wheels 110, only one of which is shown in FIG. 6.

Figure 8:
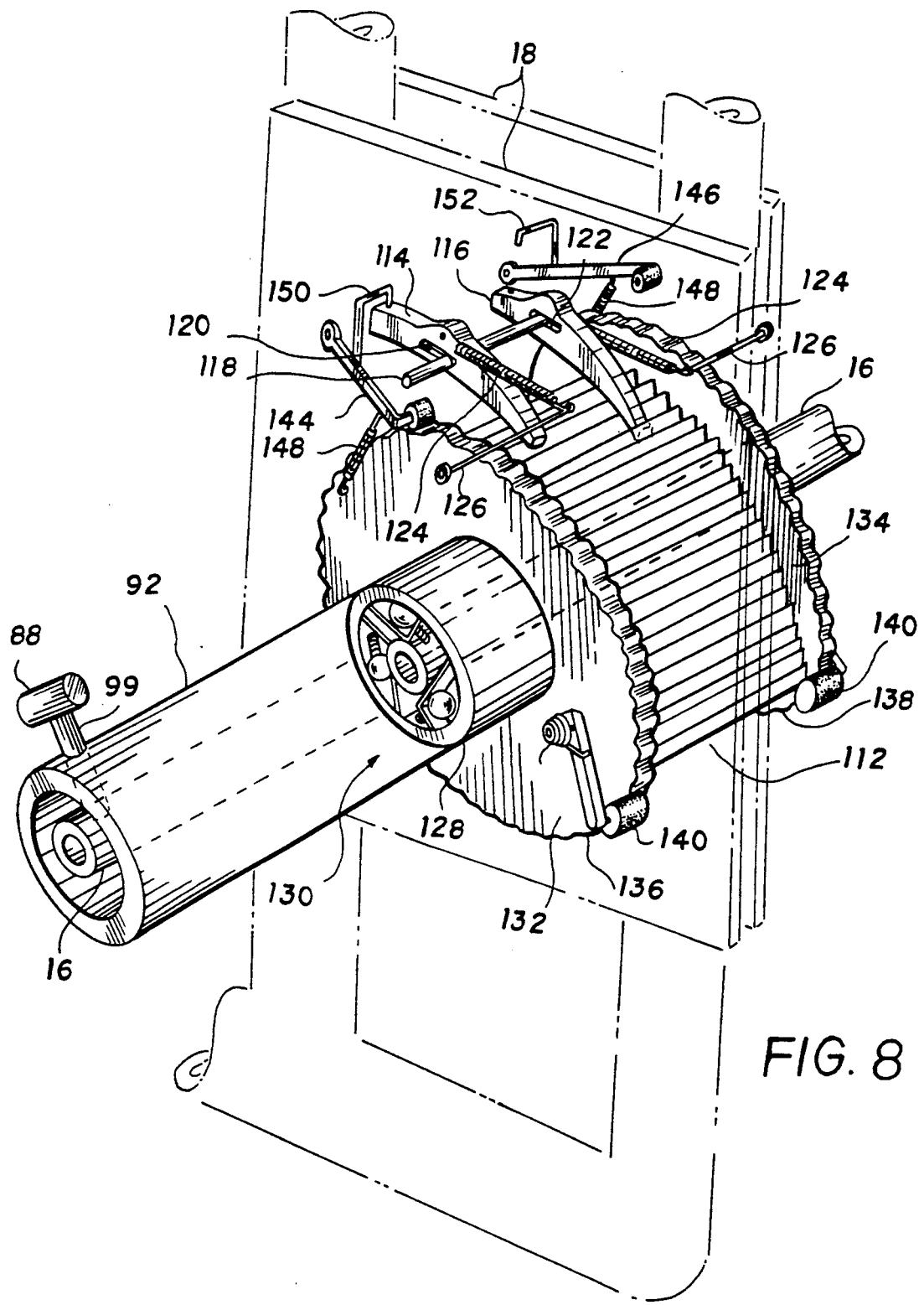
FIG. 8 is a perspective view of the ratchet and pawl device enabling controlled movement of the wheelchair in both the ascending and descending mode.

FIG. 8 illustrates the ratchet and pawl arrangement to prevent unwanted descending movement when ascending stairs 36, while permitting descending movement when the intent is to descend stairs 36. Shown is a ratchet wheel 112 fixed to shaft 16, a pair of pawls 114 and 116, slidably and pivotally mounted on a rod 118 fixed between frame plates 18 shown in phantom in FIG. 8. Each of the pawls 116, 118 respectively have an elongated slot 120, 122 to accommodate rod 118. Each of the pawls are biased by springs 124 connected between said pawls and pins 126 connected to said frame plates 18.

Also shown in FIG. 8 is a cam hub 128 mounted for free rotation on shaft 16 and incorporating a unidirectional clutch 130 disposed internally of said cam hub and fixedly mounted on shaft 16. Fixedly mounted on hub 128 are cams 132 and 134 oriented so that a low point or trough 136 on one cam 132 will be opposite a high point or tooth 138 of the second cam 134. When shaft 16 and ratchet 112 are rotated in the clockwise direction in FIG. 2, cam hub 128 and cam 132 and 134 are disconnected from shaft 16. As ratchet wheel 112 rotates in the clockwise direction the tips of pawls 114 and 116 ride over the teeth of ratchet wheel 112, with the tip of at least one pawl being in position to stop inadvertent counterclockwise rotation of ratchet wheel 112 and of sprocket drive wheels 104, assuming that the user prevents counterclockwise movement of wheels 14. Cams 132 and 134 are held in rotational position by cam followers 140 mounted on plates 18 and biased by springs 142.

However, when shaft 16 is deliberately rotated in the counterclockwise direction in FIG. 8, unidirectional clutch 130, which may be of any conventional type, connects hub 128 with shaft 16, and thereby rotates cams 132 and 134. Cam followers 144 and 146 mounted on plates 18 and biased by springs 148 to engage cams 132 and 134, have extensions 150 and 152 which alternately disengage pawls 114 and 116 from the teeth of ratchet wheel 112 by alternately pushing on the tail of the respective pawl 114, 116. As each pawl 114 or 116 is released, it will slide forward (to the right in FIG. 8) on rod 118 under the bias of its respective spring 124 to be in position to engage a succeeding tooth of ratchet wheel 112. Simultaneously the other pawl 116 or 114 already engaged with a tooth of ratchet wheel 112 is pushed backwards (to the left in FIG. 8) to engage the forward edge of slot 122 or 120 with rod 118. The slots 120 and 122 are sufficiently long to permit each pawl 114 and 116 to move forward on rod 118 a distance equivalent to two teeth on ratchet 112. This in turn will permit the wheelchair to descend stairs 36 in intermittent fashion, under the control of the user, who can stop such motion by stopping the counterclockwise rotation of wheels 14.

It should be noted that while description of the elements have in many instances been limited to a single side of the wheelchair, these elements are duplicated on the opposite side of the wheelchair, as shown in the several figures of the drawing.

In operation, the user simply backs his/her wheelchair up to the stairs he or she wishes to ascend. The user then tilts the wheelchair backwards (clockwise in FIG. 2) until the rear treads 30 are in position to engage the surfaces of stairs 36. Then by lifting control lever 62 and shifting frame plate 64 leftward, by pushing on extension 84, the forward treads 30 are positioned to climb stairs 36. The user can then manually ascend the stairs by simply rotating wheels 14 in the clockwise direction. Similarly, by manually rotating wheels 14 in the counterclockwise direction in FIG. 2, the user can descend stairs 36 as shown by arrow 154 in FIG. 2.

Figure 9:
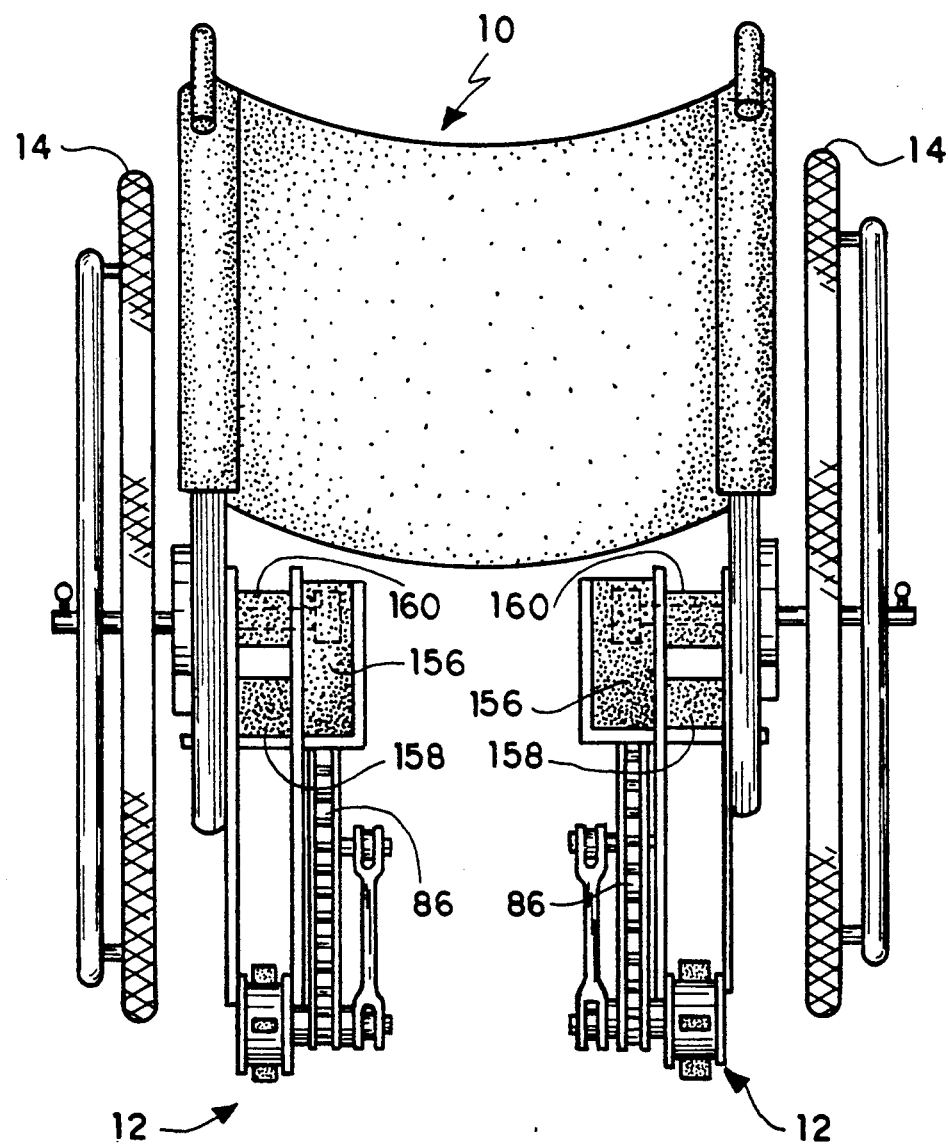
FIG. 9 is a rear view of a modified arrangement showing a battery-powered motor drive for the respective stair-engaging treads.

The arrangement shown in FIGS. 1-8 inclusive permit the wheelchair to be collapsed side-to-side for easy transportation. A motorized alternative of the disclosed embodiment is shown in FIG. 9 wherein the drive is achieved by bilaterally disposed, conventional bi-directional motors 156 powered by batteries 158, while braking is achieved by conventional electromagnetically controlled brakes 160. The chain drive connection to apparatus 12 is the same as in the embodiment of FIGS. 1-8 inclusive. The bilateral location of the motors 156, batteries 158, and brakes 160 permit the conventional wheelchair 10 to fold side to side.

Figure 10:
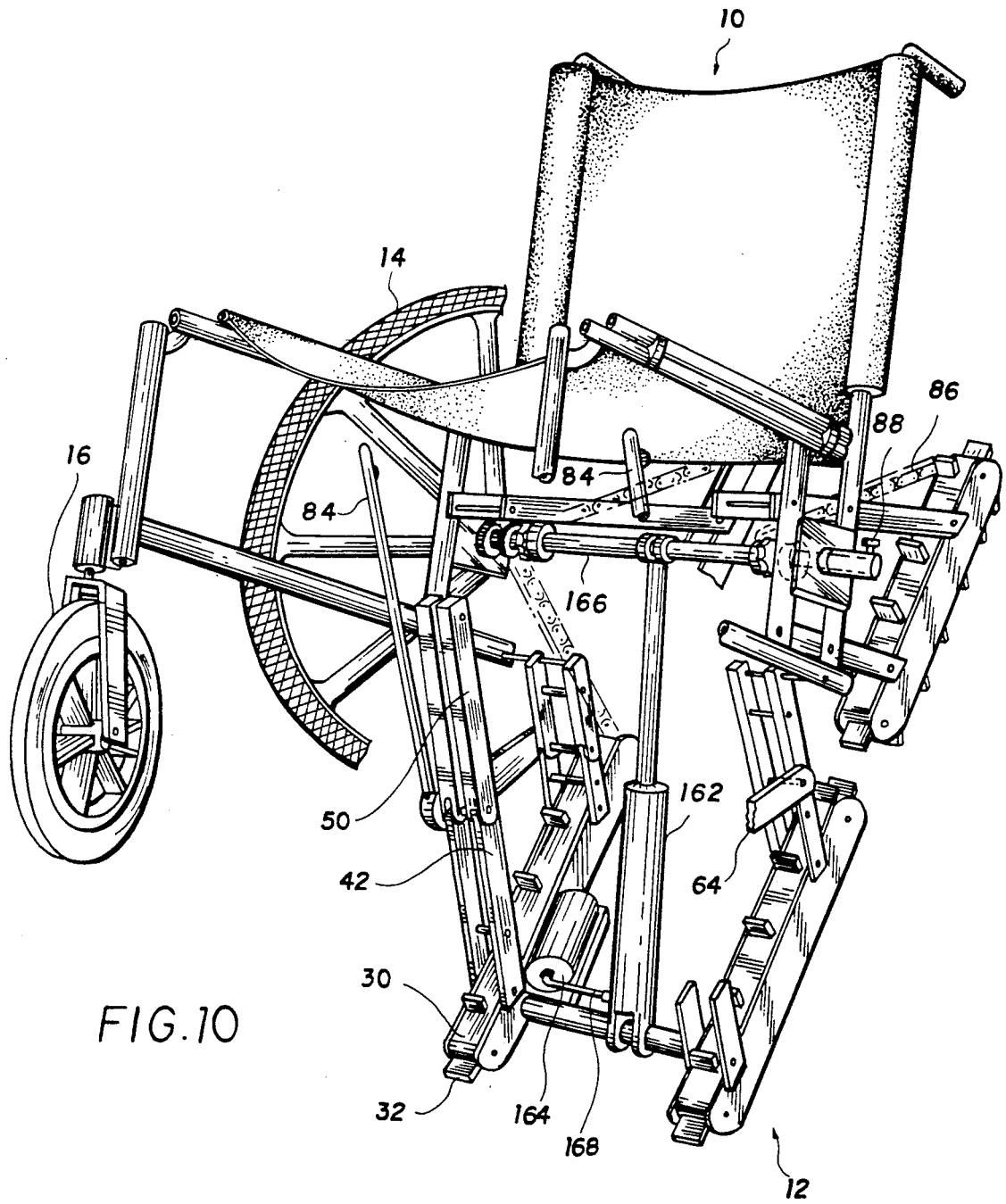
FIG. 10 is a perspective view showing the provision of hydraulic means for effecting the movement of the front treads between the operative and inoperative positions.

A third embodiment is shown in FIG. 10, wherein the tilting of wheelchair 10 preparatory to ascending and descending stairs may be achieved by a conventional hydraulic means 162 operated by a conventional drive means 164. Supporting shafts 166 and 168 can be telescopic to enable wheelchair 10 to be collapsed from side to side as in the first two embodiments. The remaining structure in FIG. 10 is the same as in FIG. 1.

While preferred embodiments of this invention have been described in some detail, it will be obvious to one skilled in the art that various modifications may be made without departing from the invention as hereinafter claimed.

I claim:

1. A mechanism for ascending and descending stairs and the like comprising:
   a wheelchair which is foldable from side to side for convenient transport when not in use; and
   ascending and descending apparatus mounted on said wheelchair; said wheelchair including bidirectional drive means for propelling said wheelchair in the forward and rearward direction under the control of the user, hub means rotatable by said drive means, and supporting frame means;
   said ascending and descending apparatus comprising:
   bilaterally disposed rear tread means fixedly mounted on said wheelchair frame means at an angle to said wheelchair;
   pivotally mounted bilaterally disposed forward tread means shiftable between an operable position aligned with and in the same plane as said rear tread means, and an inoperable position disengaged from and parallel to the ground plane;
   bilaterally disposed means to shift said forward tread means between the operable and inoperable position, including first pivotal lever means connected to said wheelchair frame means, second pivotal lever means pivoted to said first pivotal lever means by pivot means fixed to one of said first and second pivotal lever means, said forward tread means being connected to said second pivotal lever means at an end opposite to said pivot means, said pivot means being connected to a manually shiftable frame plate means having an extension means thereon, whereby said pivot means may be shifted between two positions, said pivot means being fixedly connected to a lock plate means having notch means engageable with lug means on control lever means, said lock plate means and said control lever means comprising means to lock said forward tread means in said operable and inoperable position;
   bilaterally disposed means to engage said hub means with and to disengage said hub means from a driven shaft means on each side of said wheelchair;
   each of said driven shaft means having drive sprocket means engaging drive chain means connected to drive said forward and rearward tread means on each side of said wheelchair in both the forward and rearward directions; and
   control means operable in one direction of movement of said driven shaft means to limit inadvertent reverse rotation of said driven shaft means, and operable during the deliberate reverse rotation of said driven shaft means to effect intermittent rotation in the reverse direction;
   whereby said wheelchair may selectively ascend and descend stairs and the like depending upon the direction of rotation of said drive means solely under the control of the user.

2. A mechanism according to claim 1 wherein:
   said drive means comprises manually rotated drive wheels mounted on said hub means whereby said wheelchair may be manually driven by the user to ascend and descend stairs or the like.

3. A mechanism according to claim 1 wherein:

said drive means comprises bilaterally disposed bidirectional motor means powered by bilaterally disposed batteries, and said control means comprises bilaterally disposed electromagnetic brake means.

4. A mechanism according to claim 1 wherein:

said means to engage said hub means with and to disengage said hub means from a driven shaft means comprises a rotatable T-handle means having a T-handle shaft means extending through an opening in said hub means, said T-handle shaft means having a cross-bar means disposed parallel to said T-handle means and engageable in a slot in said driven shaft means, spring means to bias and T-handle means outwardly of said slot, and clip means attached to an inner surface of said hub means for holding said T-handle means in a disengaged position.

5. A mechanism according to claim 1 wherein said control means comprises:

ratchet means fixedly mounted on said driven shaft means;

a pair of slidably and pivotally mounted pawl means to selectively engage succeeding alternate teeth of said ratchet means;

a pair of cam means fixedly attached to a cam hub means;

a pair of cam follower means having extension means thereon to alternately disengage said pair of pawl means from said ratchet means; and unidirectional clutch means disposed internally of said cam hub means to connect said cam hub means to said driven shaft means when said hub means driven by said drive means rotates in one direction and to disconnect said cam hub means from said driven shaft means when said hub means driven by said drive means rotates in a direction opposite said one direction; whereby at least one of said pawl means is effective to limit unintended reverse rotation of the ratchet means in said one direction of rotation of said drive means and effective to achieve intermittent reverse rotation of said ratchet means when said drive means is rotated in said direction opposite said one direction.

6. A mechanism for ascending and descending stairs and the like, comprising:

a wheelchair which is foldable from side to side for convenient transport when not in use; and ascending and descending apparatus mounted on said wheel-chair; said wheelchair including bidirectional drive means for propelling said wheelchair in the forward and rearward direction under the control of the user, hub means rotatable by said drive means, and supporting frame means;

said ascending and descending apparatus comprising:

bilaterally disposed rear tread means fixedly mounted on said wheelchair frame means at an angle to said wheelchair;

pivotally mounted bilaterally disposed forward tread means shiftable between an operable position aligned with and in the same plane as said rear tread means, and an inoperable position disengaged from and parallel to the ground plane;

bilaterally disposed means to shift said forward tread means between the operable and inoperable position;

bilaterally disposed means to engage said hub means with and to disengage said hub means from a driven shaft means on each side of said wheelchair, including a rotatable T-handle means having a T-handle shaft means extending through an opening in said hub means, said T-handle shaft means having a crossbar means disposed parallel to said T-handle means and engageable in a slot in said driven shaft means, spring means to bias said T-handle means outwardly of said slot, and clip means attached to an inner surface of said hub means for holding said T-handle means in a disengaged position;

each said driven shaft means having drive sprocket means engaging drive chain means connected to drive said forward and rearward tread means on each side of said wheelchair in both the forward and rearward directions; and control means operable in one direction of movement of said driven shaft means to limit inadvertent reverse rotation of said driven shaft means, and operable during the deliberate reverse rotation of said driven shaft means to effect intermittent rotation in the reverse direction;

whereby said wheelchair may selectively ascend and descend stairs and the like depending upon the direction of rotation of said drive means solely under the control of the user.

7. A mechanism according to claim 6 wherein:

said means to shift said forward tread means between the operable and inoperable position comprises hydraulic means.

8. A mechanism according to claim 6 wherein:

said drive means comprises manually rotated drive wheels mounted on said hub means whereby said wheelchair may be manually driven by the user to ascend and descend stairs or the like 9. A mechanism according to claim 6 wherein:

said drive means comprises bilaterally disposed bidirectional motor means powered by bilaterally disposed batteries, and said control means comprises bilaterally disposed electromagnetic brake means.

10. A mechanism according to claim 6, wherein said control means comprises:

ratchet means fixedly mounted on said driven shaft means;

a pair of slidably and pivotally mounted pawl means to selectively engage succeeding alternate teeth of said ratchet means;

a pair of cam means fixedly attached to a cam hub means;

a pair of cam follower means having extension means thereon to alternately disengage said pair of pawl means from said ratchet means; and unidirectional clutch means disposed internally of said cam hub means to connect said cam hub means to said driven shaft means when said hub means driven by said drive means rotates in one direction and to disconnect said cam hub means from said driven shaft means when said hub means driven by said drive means rotates in a direction opposite said one direction; whereby at least one of said pawl means is effective to limit unintended reverse rotation of the ratchet means in said one direction of rotation of said drive means and effective to achieve intermittent reverse rotation of said ratchet means when said drive means is rotated in said direction opposite said one direction.

* * * * *